United States Patent [19]

Dunkers

[11] Patent Number: 5,536,409
[45] Date of Patent: Jul. 16, 1996

[54] WATER TREATMENT SYSTEM

[75] Inventor: Karl R. Dunkers, Taby, Sweden

[73] Assignee: Citec International Incorporated, Vaasa, Finland

[21] Appl. No.: 328,517

[22] Filed: Oct. 25, 1994

[51] Int. Cl.$^6$ ............................................. B01D 21/02
[52] U.S. Cl. .................... 210/519; 210/521; 210/525; 210/540
[58] Field of Search ........................... 210/519, 521, 210/522, 525, 533, 538, 540

[56] References Cited

U.S. PATENT DOCUMENTS

| | | | |
|---|---|---|---|
| Re. 30,793 | 11/1981 | Dunkers | 210/522 |
| 924,285 | 6/1909 | Smith . | |
| 2,119,013 | 5/1938 | Kerns et al. | 201/521 |
| 2,861,692 | 11/1958 | Humphreys | 210/521 |
| 2,868,384 | 1/1959 | Puddington | 210/521 |
| 3,346,122 | 10/1967 | Cornelissen | 210/540 |
| 3,529,728 | 9/1970 | Middebeek et al. | 210/540 |
| 3,552,554 | 1/1971 | Olgard | 210/519 |
| 3,640,387 | 2/1972 | Conley et al. | 210/521 |
| 3,898,164 | 8/1975 | Hsiung | 210/521 |
| 4,120,796 | 10/1978 | Huebner | 210/522 |
| 4,120,797 | 10/1978 | Huebner | 210/522 |
| 4,144,170 | 3/1979 | Dunkers | 210/221 P |
| 4,150,683 | 4/1979 | Simon | 137/1 |
| 4,225,434 | 9/1980 | Ernst et al. | 210/98 |
| 4,290,898 | 9/1981 | von Hagel et al. | 210/738 |
| 4,298,471 | 11/1981 | Dunkers | 201/170 |
| 4,351,733 | 9/1982 | Salzer et al. | 210/738 |
| 4,377,477 | 3/1983 | Dunkers | 210/170 |
| 4,388,190 | 6/1983 | Haddock | 210/522 |
| 4,400,280 | 8/1983 | Larsson et al. | 210/802 |
| 4,477,344 | 10/1984 | Olszewski et al. | 210/109 |
| 4,514,303 | 4/1985 | Moore | 210/521 |
| 4,515,698 | 5/1985 | Stewart | 210/802 |
| 4,597,869 | 7/1986 | Hakansson | 210/232 |
| 4,664,792 | 5/1987 | Fors et al. | 210/170 |
| 4,681,683 | 7/1987 | Lindstol | 210/521 |
| 4,701,260 | 10/1987 | Lee | 210/521 |
| 4,793,926 | 12/1988 | Vion | 210/521 |
| 4,895,652 | 1/1990 | Cornelissen | 210/320 |
| 4,923,330 | 5/1990 | DeTommaso | 405/36 |
| 4,927,543 | 5/1990 | Bablon et al. | 210/711 |
| 4,941,977 | 7/1990 | Cornelissen | 210/521 |
| 5,028,333 | 7/1991 | Wright et al. | 210/521 |
| 5,045,344 | 9/1991 | Yokota | 210/521 |
| 5,049,278 | 9/1991 | Galper | 210/521 |
| 5,089,136 | 2/1992 | Cyr | 210/519 |
| 5,173,195 | 12/1992 | Wright et al. | 210/802 |
| 5,223,154 | 6/1993 | MacPherson, Jr. et al. | 210/790 |
| 5,228,983 | 7/1993 | Nims | 210/122 |
| 5,242,604 | 9/1993 | Young et al. | 210/768 |
| 5,249,887 | 10/1993 | Phillips | 405/36 |
| 5,252,230 | 10/1993 | Dunkers | 201/792 |
| 5,366,638 | 11/1994 | Moore | 210/521 |

FOREIGN PATENT DOCUMENTS

| | | |
|---|---|---|
| 2330405 | 7/1974 | Germany . |
| 2852966 | 10/1979 | Germany . |

*Primary Examiner*—Christopher Upton
*Attorney, Agent, or Firm*—Oliff & Berridge

[57] ABSTRACT

A water treatment tank for separating particles from water, has a separation chamber with at least one set of inclined parallel plates, with a slot between each pair of adjacent plates for substantial horizontal flow of water between the plates. A sludge chamber is located beneath the separation chamber for collecting sludge including the particles separated from the water during passage of the water through the separation chamber. An inlet chamber on one side of the separation chamber introduces the substantially horizontal flow of water into the separation chamber, and an outlet chamber on an opposite side of the separation chamber receives the flow in the substantially horizontal direction from the separation chamber. The outlet chamber is located above and communicates with the sludge chamber and further separates particles from the water in the outlet chamber, the particles descending into the sludge chamber. An outlet channel is located in an upper portion of the outlet chamber and has an outlet weir on each side of the outlet channel. The outlet channel and outlet weirs extend for the length of the separation chamber, and a surface layer of water in the outlet chamber overflows the outlet weirs into the outlet channel to create an outflow. An overflow rate of water per unit length of the outlet weirs is minimized for a given tank flow rate.

17 Claims, 9 Drawing Sheets

WATER TREATMENT SYSTEM

BACKGROUND OF THE INVENTION

1. Field of the Invention

This invention relates to treatment systems that treat municipal and industrial wastewater, raw water for a potable water supply, stormwater, urban runoff and combined sewer overflow (CSO), or any other flows of water having suspended particles. The inventive systems remove suspended particles from the water and, in particular applications for handling stormwater and CSO, retain and balance the flow to be treated.

2. Description of Related Art

Tanks for treating water to remove particles often utilize multiple parallel inclined plates with gaps between the plates that form passageways for the water to flow between the plates. The inclination of the plates creates a larger total horizontal projected settling area than a tank without inclined plates. This enlarged settling area increases particle settling ability in accordance with known surface load theories.

As the water flow passes through the gaps between the plates, particles settle out of the flow onto the surfaces of the inclined parallel plates. Because the plates are inclined to the horizontal, the particles move down the surfaces of the plates, off the ends of the plates, and down into a particle collection chamber below the plates. Over a period of time, some of the particles deposited on the surface of the inclined plates can accumulate to the point where the passageways between the plates become partially or completely clogged.

The treatment tank typically has an outlet channel having outlet openings or outlet weirs that allow a surface layer of water in the tank to overflow the outlet weir into the outlet channel to form an outflow. It is desirable to keep the "overflow" rate (the rate at which water is overflowing an outlet weir, per unit length of the outlet weir), to a relatively low rate to ensure that only a thin surface layer of water flows over the outlet weirs. The greater the overflow rate, the thicker the surface layer of water flowing over the outlet weir, and the more particles will be carried into the outflow.

Prior art treatment systems for handling stormwater, urban runoff, and combined sewer overflow mainly comprise retention tanks or tunnels dimensioned to collect and store a flow during and after a storm event, and devices for pumping the stored flow to existing treatment plants for treatment after termination of the storm event. Existing retention tanks and tunnels are not designed or equipped for treatment; they only function as storage tanks. Stored water is pumped from the retention tanks to existing or constructed sewage treatment plants after the storm events, for treatment.

SUMMARY OF THE INVENTION

A treatment tank of the present invention is provided with an inlet chamber, a separation chamber having a set of inclined parallel plates, and an outlet chamber having an outlet channel. As water passes through the gaps between the plates, particles suspended in the water settle onto the surface of the plates, travel down the inclined surface of the plates, then fall off the end of the plates into a sludge chamber located beneath the separation chamber.

For a stormwater application, the treatment tank described above is generally referred to as a "crossflow plate separation" tank. The settling tanks and settling/storage tanks are coupled in parallel. The term "crossflow" refers to the fact that the water moves in a generally horizontal direction from an inlet chamber to an outlet chamber while suspended particles in the water move in a generally vertical direction toward the bottom of the tank as they settle out of the water. The flow of water and the flow of particles are thus "crossflows".

An outlet channel extending the length of the tank is provided in an upper portion of the outlet chamber. The outlet channel has outlet weirs on both sides of the outlet channel that allow a surface layer of water in the outlet chamber to overflow the outlet weirs, into the outlet channel, to create an outlet flow that is free of suspended particles.

The overflow rate is determined by the flow rate of water over the outlet weirs, per unit length of the outlet weirs. As discussed above, it is desirable to keep the overflow rate relatively low to minimize the amount of particles carried into the outflow, thus maximizing the quality of the outflow. By providing an outlet channel that extends the entire length of the tank, and that has outlet weirs on both sides of the outlet channel, the total length of the outlet weirs is maximized. Consequently, for a given tank flow rate, the overflow rate is minimized, and the quality of the outflow is maximized. Conversely, for a given outflow water quality, the tank flow rate may be maximized.

A tank of the present invention also includes one or more air distribution pipes located underneath the inclined parallel plates. During a "plate rinsing cycle", air is released from plural apertures in the distribution pipes to create bubbles. The bubbles rise up through the gaps between the inclined parallel plates to the surface of the water. The passage of the bubbles through the gaps between the plates dislodges any particles clogged between the plates. The air distribution pipes obviate the need to: 1) remove the plates from the tank to clean particles trapped between the plates, and 2) regularly empty and wash the entire tank, thus reducing the amount of time the treatment tank is unusable due to cleaning.

For a stormwater application, the treatment system embodying the present invention may have one or more settling treatment tanks, and one or more settling/storage treatment tanks that also function as storage tanks. The settling tanks and settling/storage tanks are coupled in parallel. The settling/storage treatment tanks may be physically identical to the settling treatment tanks, and like the settling treatment tanks, they may continuously treat water whenever there is an incoming flow. The settling/storage treatment tanks, however, are equipped with pumps for pumping the water volume in the settling/storage treatment tanks into the inlet of the settling treatment tanks.

During, or before, the first phase of a storm event, when the flow rate of water arriving at the system is relatively low, all water is treated in the settling treatment tank. When the flow rate of water arriving at the treatment system increases to greater than the maximum capacity of the settling treatment tank, a portion of the water is directed to settling/storage treatment tanks. During this period, the settling/storage treatment tanks will gradually fill up. Once full, the settling/storage treatment tanks will operate like the settling treatment tanks to remove suspended particles from the water. The total number and volume of the settling/storage treatment tanks may be sized so that during maximum stormwater flow conditions, all stormwater can be collected and treated by the combined settling and settling/storage treatment tanks. After the storm event, the water volume in the settling/storage treatment tanks is pumped to the inlet of the settling treatment tanks so that the settling/storage treatment tanks are emptied between storm events.

A prior art system consists of storage tanks and pumps for pumping stored stormwater back to existing interceptors or sewage treatment plants for treatment. The prior art systems do not include treatment equipment or facilities connected to the storage or retention tanks. As a result, the storage or retention tanks must be dimensioned to hold almost the entire amount of stormwater flow.

In contrast, the tanks of the present invention treat the stormwater during and after a storm event to remove suspended solids. This enables the tanks of the present invention to be dimensioned to hold less volume than prior art systems. Tanks according to the present invention are dimensioned based on the total stormwater flow minus the flow treated in the settling and settling/storage tanks, and minus the empty volume in the settling/storage tanks due to pumping of water from the settling/storage tanks to the settling tanks between storm events. The total tank volume for a system according to the present invention is about half the total tank volume of a prior art system. In addition, there is no need to pump stored water to a separate treatment plant. The present system thereby eliminates the usual overloading of sewage treatment plants that occurs during and after a storm event.

BRIEF DESCRIPTION OF THE DRAWINGS

The invention will be described in detail with reference to the following figures wherein like elements bear like reference numerals and wherein.

DETAILED DESCRIPTION OF THE PREFERRED EMBODIMENTS

Figure 1:
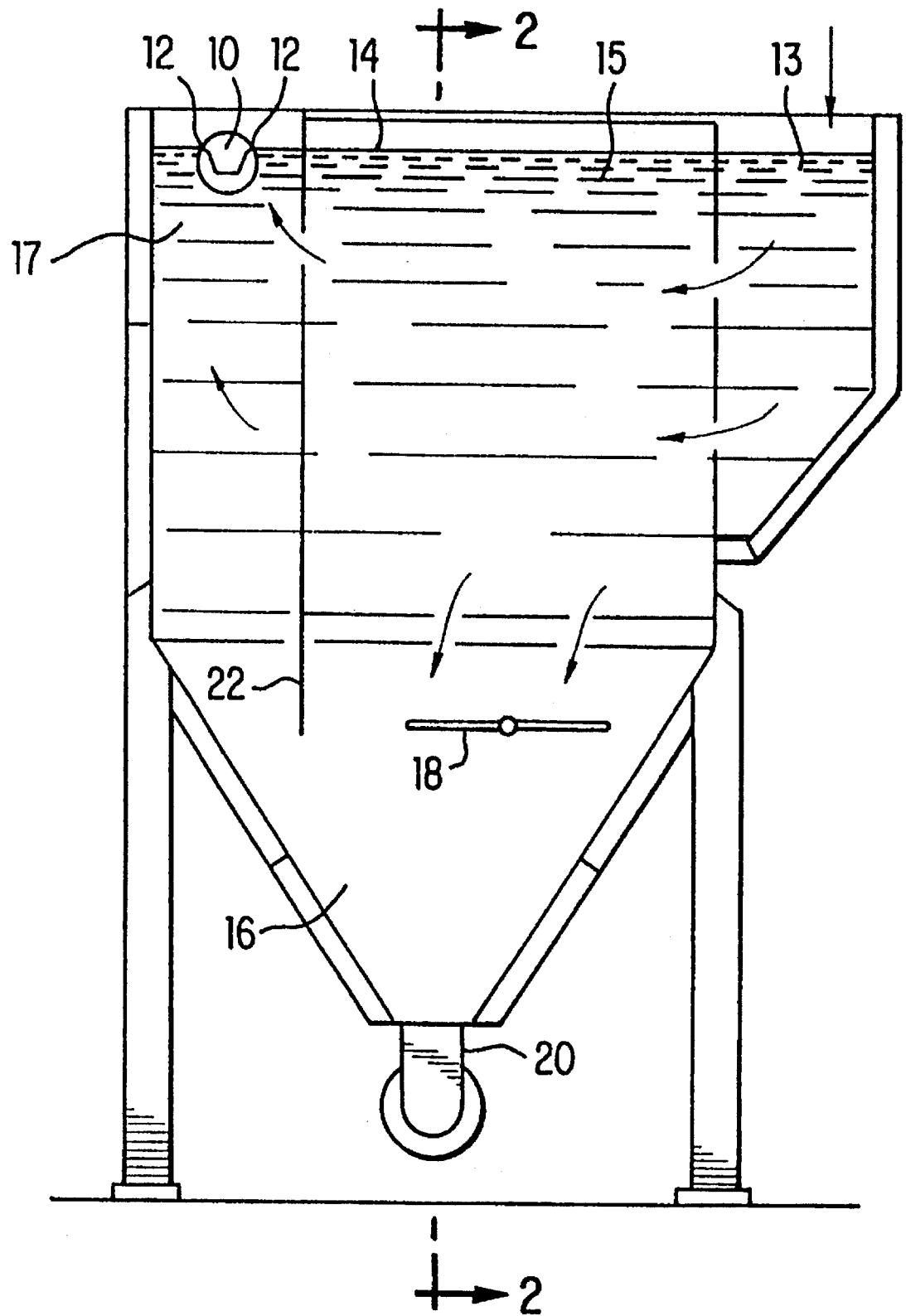
FIG. 1 is a sectional view of a first embodiment of the present invention.

A first embodiment of a tank of the present invention will be described with reference to FIGS. 1 and 2.

The treatment tank has an inlet chamber 13, a separation chamber 15, an outlet chamber 17 and a sludge chamber 16. The inlet chamber 13 receives water having suspended particles and directs the water to the separation chamber 15 in a generally horizontal flow direction. The separation chamber 15 includes plural inclined parallel plates 19 which have flow passages 23 between the plates 19. Particles in the water passing between the inclined parallel plates 19 settle onto the surface of the plates 19. Most particles deposited on the surface of the inclined parallel plates 19 slide down the surface of the plates 19, fall off the ends 19a of the plates 19, and settle on the bottom of the tank in a sludge chamber 16.

The water exiting from the separation chamber 15 enters the outlet chamber 17 in a generally horizontal flow direction. Particles which have not settled on the surface of the parallel plates 19 gradually fall within the outlet chamber 17 down to the sludge chamber 16.

An outlet channel 10 is provided in the outlet chamber 17. There are outlet weirs 12 on each side of the outlet channel 10 so that the surface layer 14 of water can overflow the outlet weirs 12 into the outlet channel 10 to form an outflow.

The treatment tank also includes an air distribution pipe 18 which is located underneath the separation chamber 15. The air distribution pipe 18 has plural apertures to introduce air from the pipe as bubbles. The air distribution pipe 18 provides a periodic burst of air bubbles which travel from the air distribution pipe 18 up through the gaps between the inclined parallel plates 19 and eventually to the surface of the treatment tank. The passage of the bubbles through the gaps between the plates 19 dislodges particles clogged between the plates 19.

The treatment tank may also be provided with a sludge exit pipe 20 which allows the particles collected in the sludge chamber 16 to be discharged from the tank for disposal. A sludge valve 21 may be provided in the sludge exit pipe 20 to selectively control the flow of sludge out of the tank. When particles in the sludge chamber 16 are discharged from the tank, the water volume in the tank is decreased. This means that the surface layer 14 of the water in the outlet chamber 17 will drop below the tops of the outflow weirs 12, interrupting the outflow.

A controller may be provided to cause bubbles to be emitted from the air distribution pipes 18 during a period when the surface layer 14 of water in the tank is below the outlet weirs and the outflow is interrupted to ensure that particles that are stirred up by the bubbles do not enter the outflow. Water may still be introduced into the inlet chamber during this period.

The treatment tank may also include a baffle 22 which extends the length of the treatment tank underneath the separation chamber 15. The baffle 22 prevents a short circuit of water from flowing underneath the separation chamber 15 and directly into the outlet chamber 17. This ensures that all water entering the inlet chamber 13 flows through the separation chamber 15 before reaching the outlet chamber 17.

Figure 2:
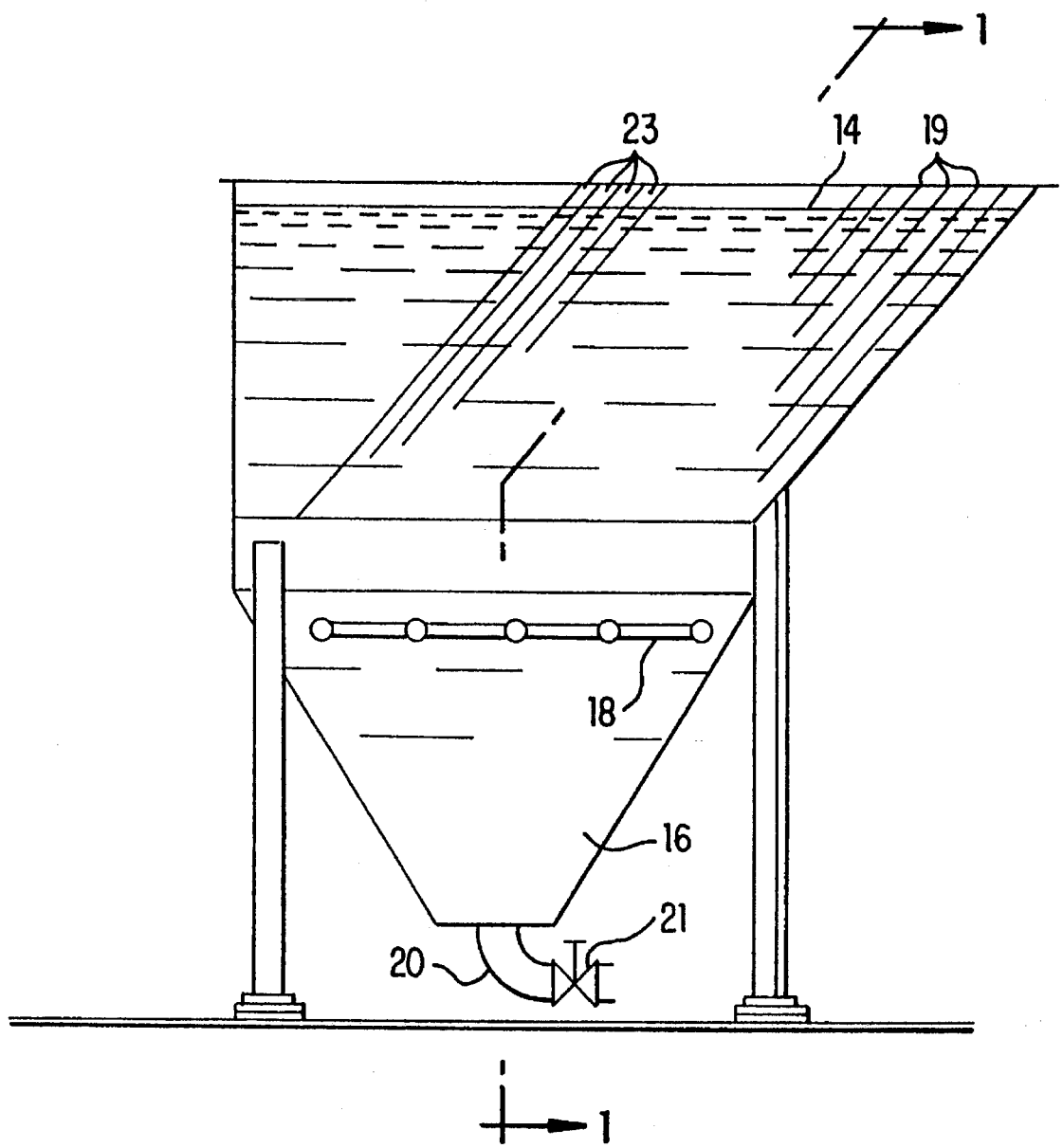
FIG. 2 is a sectional view of inclined parallel plates taken along section line 2—2 of FIG. 1.

It is possible to alter the treatment tank shown in FIGS. 1 and 2 so that two separated sets of inclined parallel plates are provided in the tank. The width of the separation chamber includes the width of both sets of inclined parallel plates.

Figure 3:
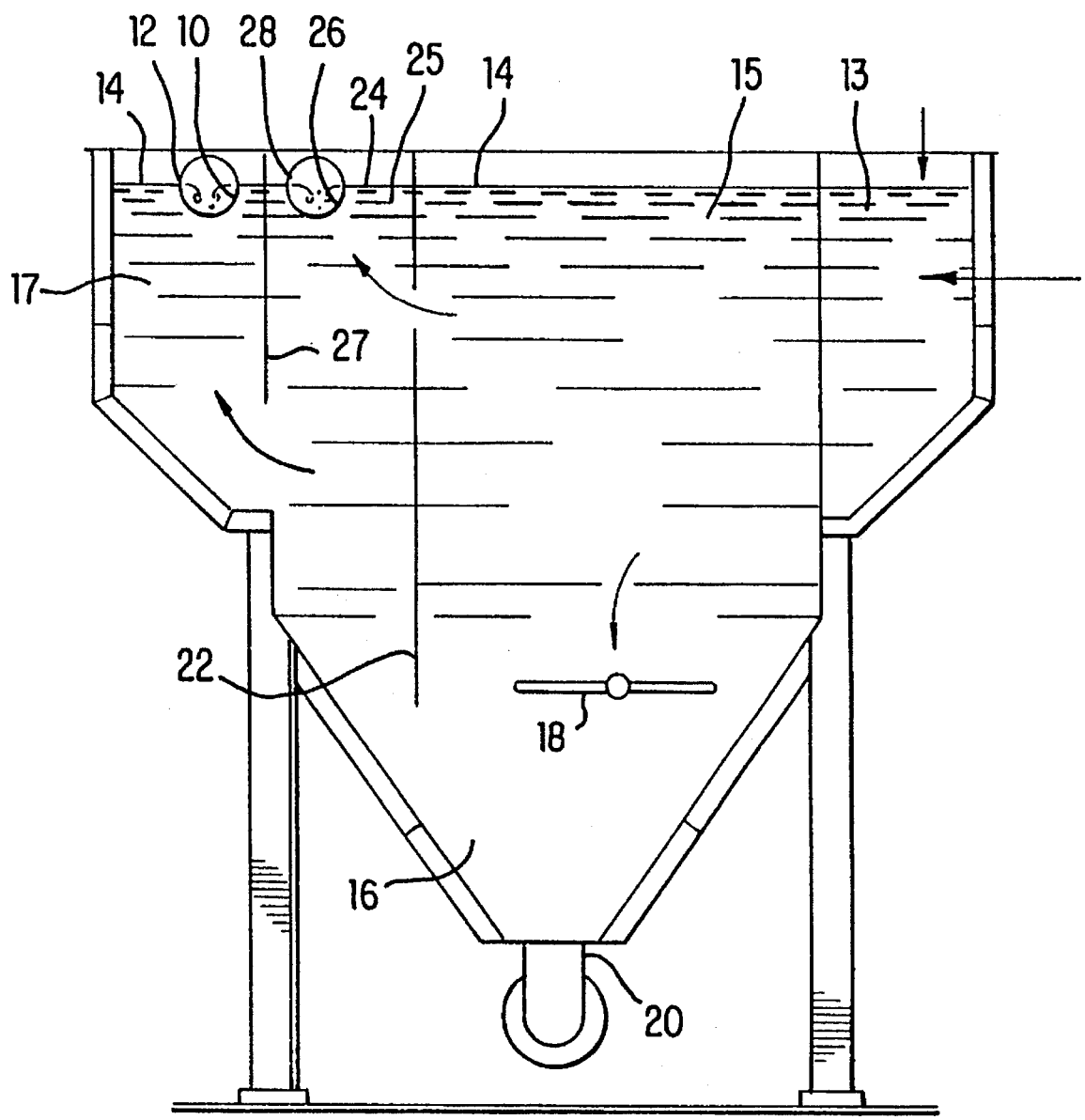
FIG. 3 is a sectional view of a second embodiment of the present invention.

The second embodiment of the treatment tank, shown in FIG. 3, has all of the features of the first embodiment and additionally includes a collection chamber located between the separation chamber 15 and the outlet chamber 17. A baffle 27, extending the full length of the tank, separates the collection chamber 25 from the outlet chamber 17. A collection channel 26, having two collection weirs 28, is provided in the collection chamber 25.

The water exiting the separation chamber 15 is provided in a generally horizontal flow direction to the outlet chamber 17. Contaminants such as oil, which are lighter than water, will float to the surface of the collection chamber 25. Since the collection weirs 28 are adjusted slightly under the water level in chamber 17, floating contaminates such as oil can consequently be discharged over the top of the collection weirs 28 into the collection channel 26 to form a contaminant outflow. The discharge from the channel 26 can be arranged either as a continuing outflow, or as a sequenced outflow automatized by a timer and a shut-off valve.

The baffle 27 prevents contaminants floating on the surface layer 24 from entering the outlet chamber 17. Water must pass underneath the baffle 27 to reach the outlet chamber 17. This ensures that contaminants that are lighter than water, and that float toward the surface of the collection chamber 25, should not reach the outlet chamber 17.

Figure 4:
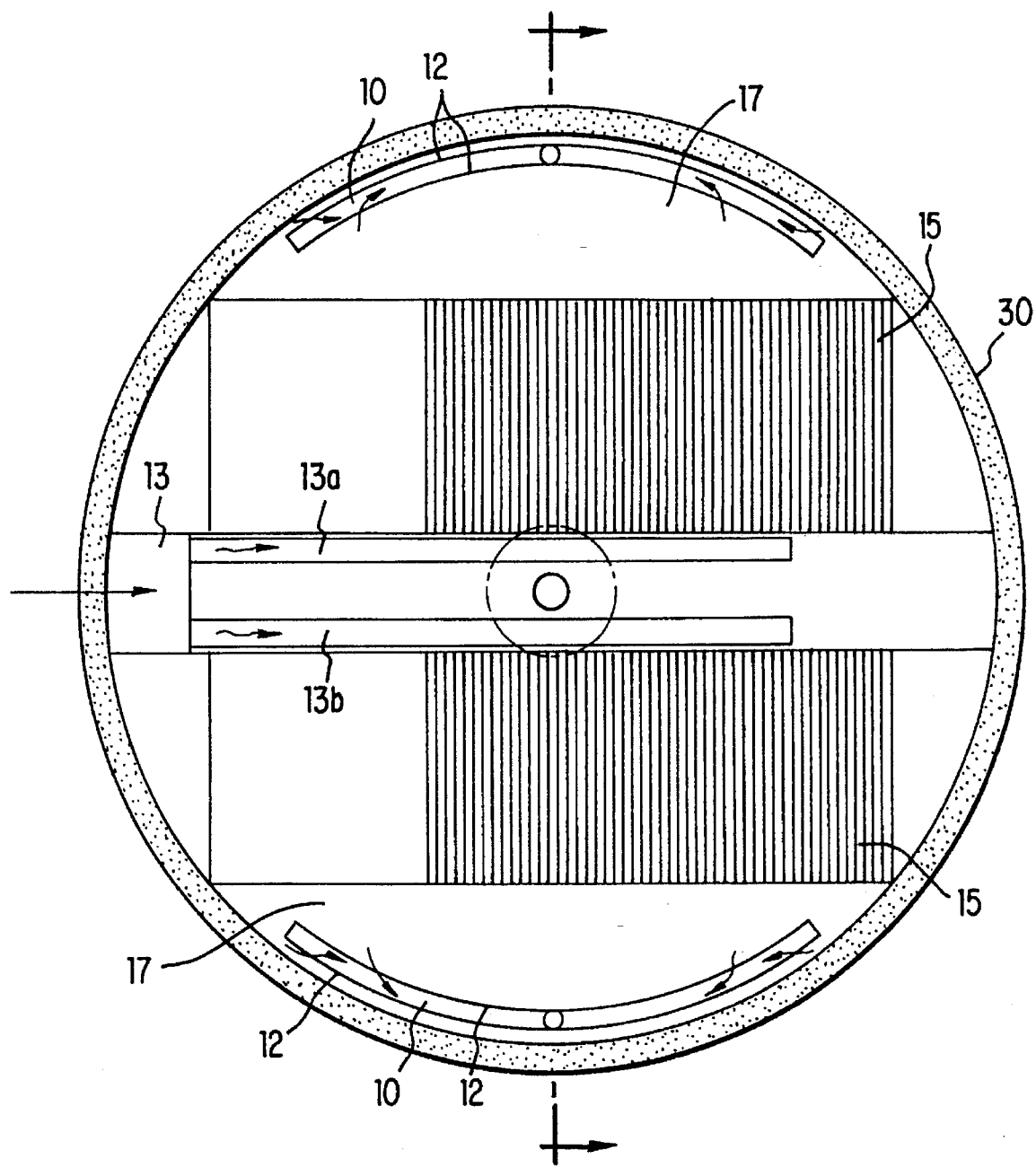
FIG. 4 is a plan view of a third embodiment of the present invention.

A third embodiment of a treatment tank of the present invention, shown in the plan view of FIG. 4, includes an inlet chamber 13 that introduces water into a central portion of a cylindrical treatment tank. The water in the inlet chamber 13 is divided into two parallel distribution channels 13a and 13b, from which the flow is distributed in a generally horizontal flow in two opposite directions towards the sides of the treatment tank.

The treatment tank has two separation chambers 15, each having a plurality of inclined parallel plates. Water from the inlet chamber 13 enters the separation chambers 15 in a generally horizontal flow direction and passes through the gaps between the inclined parallel plates of the separation chambers 15. Particles in the water settle onto the surface of the plates, glide down the plates, and fall to a common sludge chamber in the bottom of the treatment tank.

Water leaving the separation chambers 15 enters the outlet chambers 17 on the sides of the treatment tank. Outlet channels 10 are provided in each of the outlet chambers 17, and each outlet channel 10 includes two outlet weirs 12.

A treatment tank as shown in FIG. 4 employs two arc-shaped outlet channels, each having two outlet weirs. This further increases the total length of the outlet weirs so that the overflow rate of water flowing over the outlet weirs, per unit length of the outlet weirs, is minimized, and the quality of the outflow is maximized.

Figure 5:
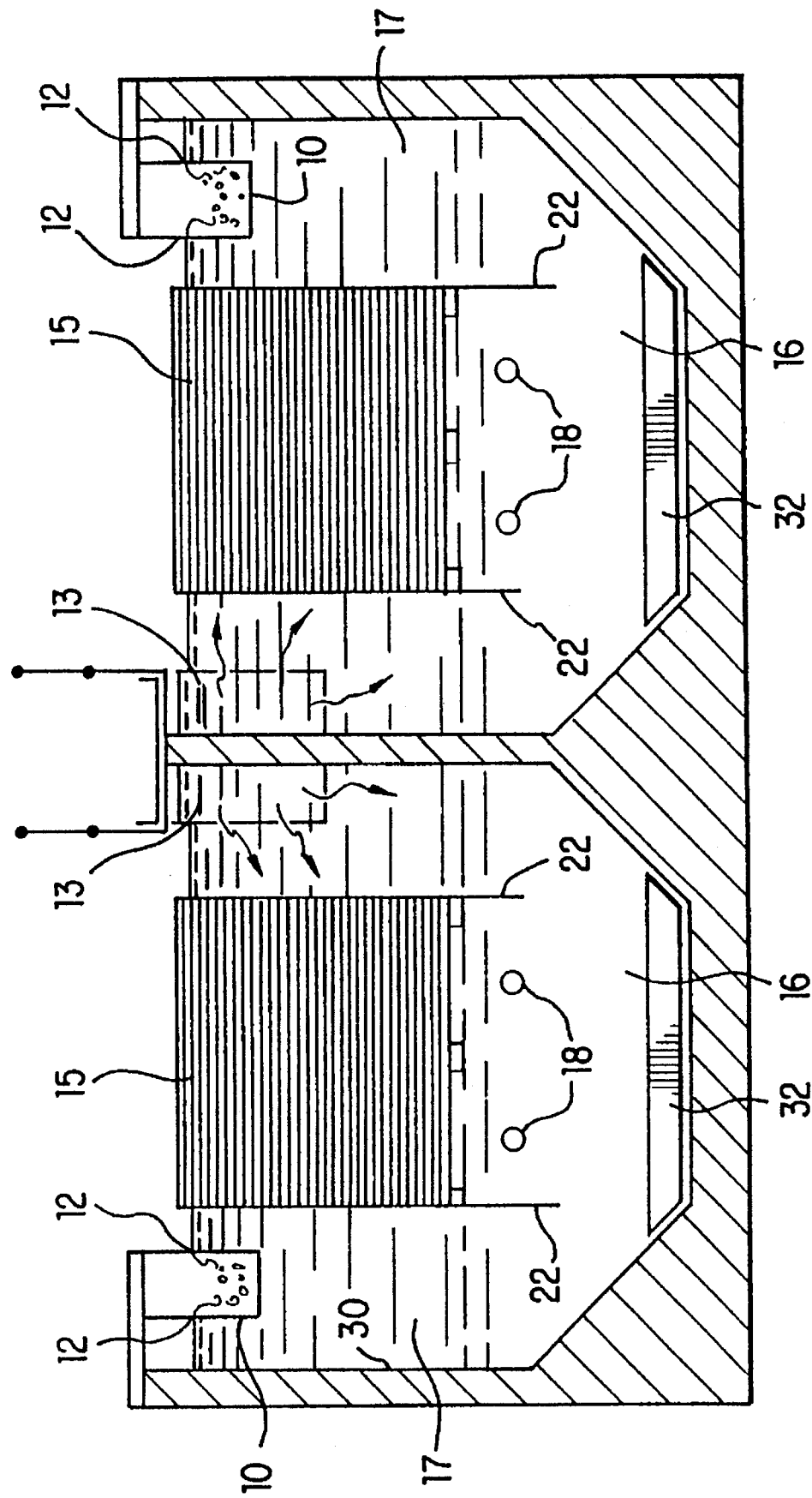
FIG. 5 is a sectional view of a fourth embodiment of the present invention.

In a fourth embodiment of the present invention, shown in FIG. 5, water is introduced to the tank in a central portion in two opposite, relatively horizontal directions through an inlet chamber 13. The water flows through gaps between inclined parallel plates of two separation chambers 15 and enters outlet chambers 17.

Outlet channels 10 are provided in each of the outlet chambers 17. Each outlet channel 10 extends for the length of the tank and includes two outlet weirs 12, one on each side of the outlet channel.

Air distribution pipes 18 are provided underneath the separation chambers 15. During a plate rinsing cycle air bubbles emitted from the air distribution pipes 18 travel up through the gaps between the plates in the separation chambers 15 to dislodge particles clogged between the plates.

Flow baffles 22 may be provided underneath the separation chambers 15 to prevent water from flowing under the separation chambers 15, and flowing directly into the outlet chambers 17. The baffles 22 ensure that water entering the tank through the inlet chamber 13 must pass through the separation chambers 15.

Scraper blades 32 may be provided in sludge chambers 16 underneath the separation chambers 15 and outlet chambers 17. The scraper blades scrape collected particles toward a sludge collection point.

Figure 6:
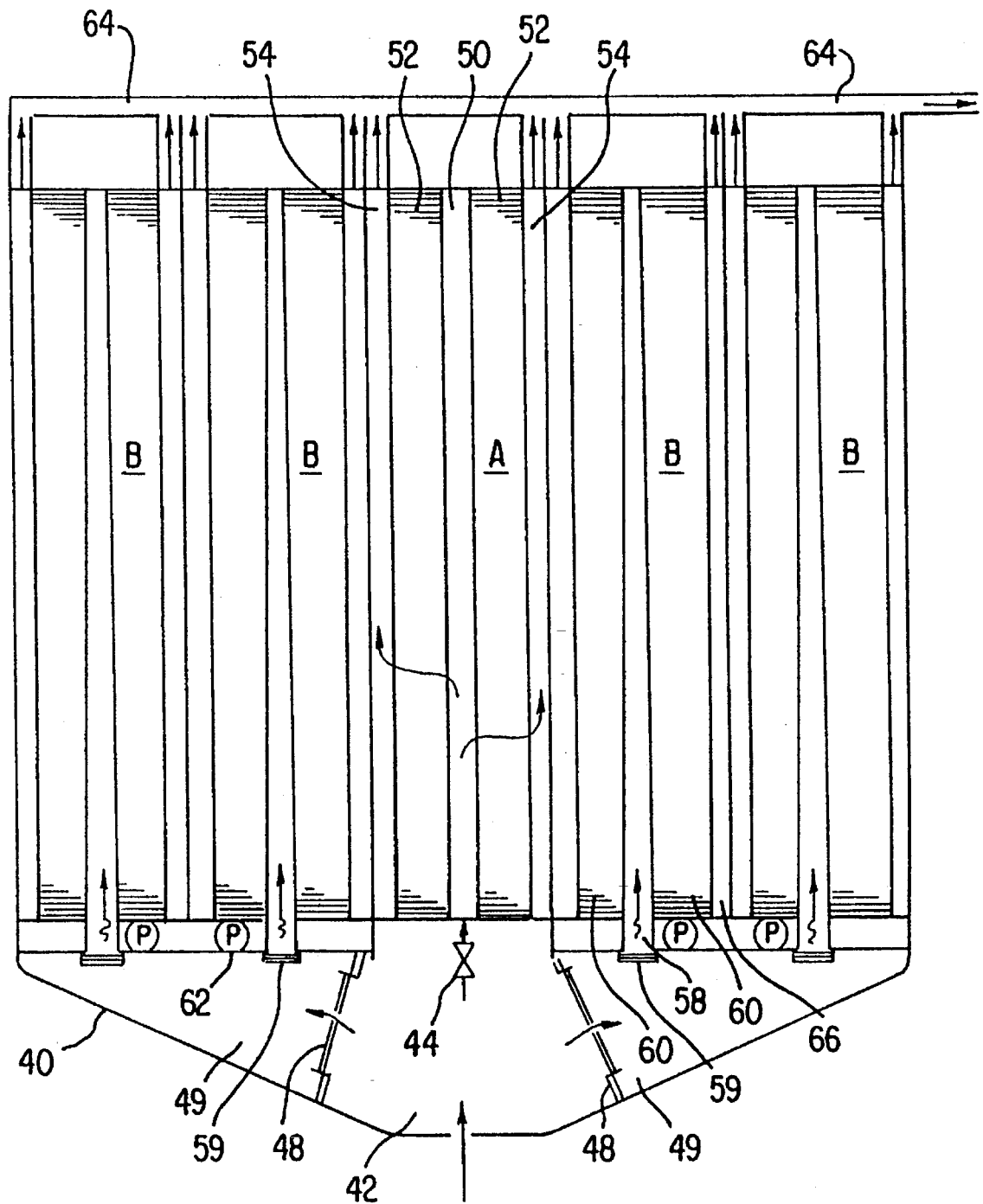
FIG. 6 is a plan view of a treatment system of the present invention.

An embodiment of a complete storm water treatment and storage system of the present invention is shown in FIG. 6. In this embodiment, the treatment tanks employ the same crossflow design as shown in FIGS. 1–5.

The system has one or several settling treatment tanks located close to each other in the system. An inlet valve 44 controls the flow rate of water entering the settling treatment tank. The water enters the settling treatment tank A through an inlet chamber 50 and flows in opposite horizontal directions through the separation chambers 52 where particles settle onto the inclined parallel plates. Water overflows outlet weirs on outlet channels 54, to form an outflow, and the outflow is directed into a common outlet channel 64.

Settling/storage treatment tanks B are provided close to the settling treatment tanks A within the same tank system. The settling/storage treatment tanks are also of the crossflow design depicted in FIGS. 1–5. The settling/storage treatment tanks B may be physically identical to the settling treatment tanks A except for discharge pumps 62 and inlet arrangements 48 and 59.

When the flow rate of water entering the system exceeds the maximum designed flow rate of the settling treatment tank A, the flow rate into the settling treatment tank A is limited by the inlet valve 44 to the maximum designed flow rate. Excess water collects in the inlet area 42. When the water level has risen high enough in the inlet area 42, it begins to overflow inlet weirs 48 and enters settling/storage inlet areas 49. Water in the settling/storage inlet areas 49 is then selectively routed to the inlet chambers 58 of the settling/storage treatment tanks via gates 59.

Water is introduced into the settling/storage treatment tanks B through the inlet chambers 58 of the settling/storage treatment tanks B. Like the settling tank A, water in the settling/storage tanks B flows in opposite horizontal directions through the separation chambers 60 of the settling/storage treatment tanks B. Particles settle on the inclined parallel plates of the separation chambers 60, and the water overflows outlet weirs into outlet channels 66 to form an outflow, the outflow joining the outflow from the settling treatment tank A in the common outlet channel 64.

Figure 8:
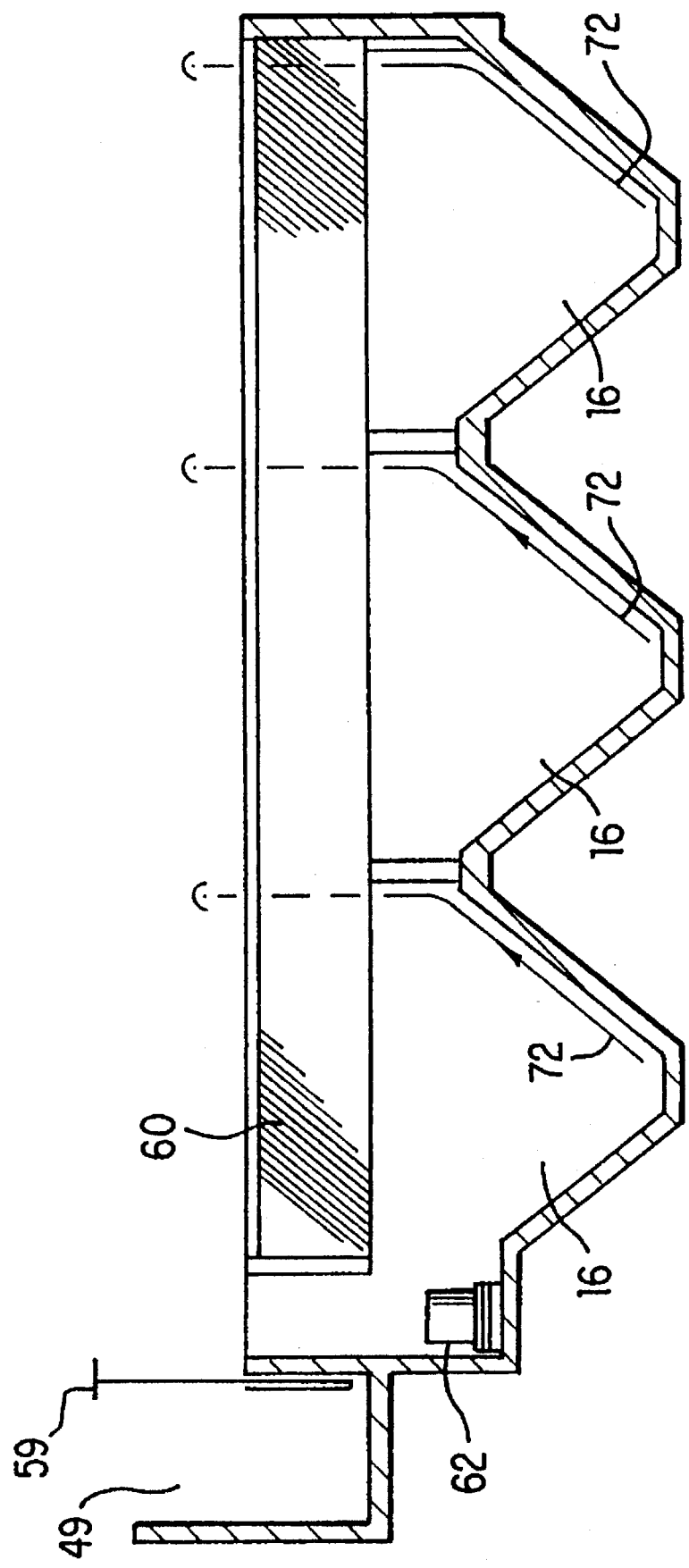
FIG. 8 is a sectional view of a treatment tank of the present invention.

A sectional view of a settling/storage treatment tank is shown in FIG. 8. The sectional view shows the inclined parallel plates of one of the separation chambers 60. Water passes through the gaps between the inclined parallel plates of the separation chamber 60 and particles settle onto the surface of the plates. The particles glide down the plates and fall into the sludge chambers 16. The water flow into the inlet chamber of the settling/storage treatment tank is controlled by a gate 59, which is raised or lowered to control entry of water into the inlet chamber of the settling/storage treatment tank.

A pump 62 is provided in the settling/storage treatment tank for pumping stored water from the settling/storage treatment tank to the inlet area of the settling treatment tank after storm events. Sludge pipes 72 extend from near the bottom of the sludge chambers 16 out of the settling/storage treatment tank. When the sludge chamber 16 becomes full of collected particles, the particles can be discharged out of the tank through the sludge pipes 72.

Figure 9:
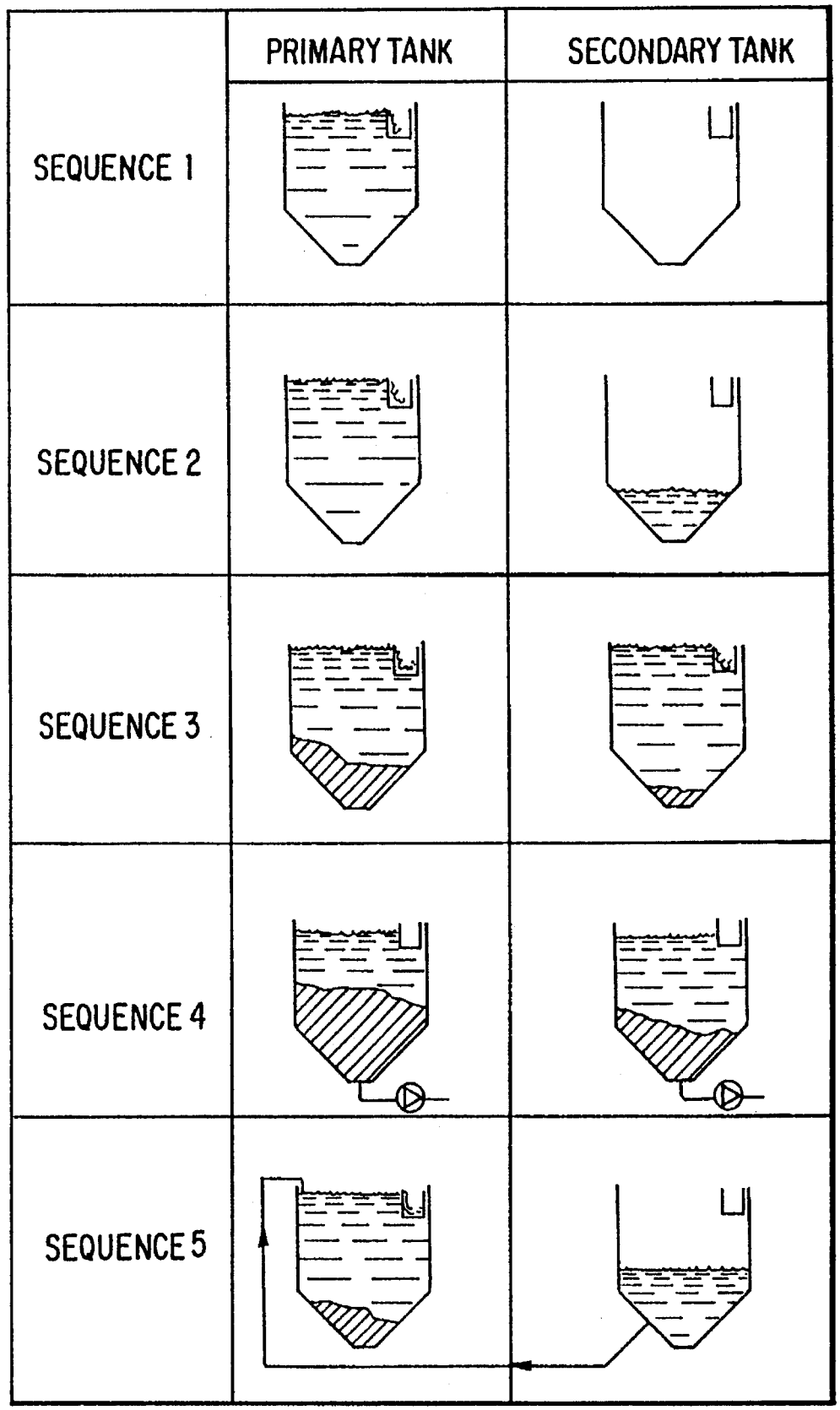
FIG. 9 depicts flow conditions for settling and settling/ storage treatment tanks used in a system of the present invention.

Operation sequences of the settling and settling/storage treatment tanks of a system of the present invention are shown in FIG. 9. The lefthand column of treatment tanks represents a settling treatment tank and the righthand column represents a settling/storage treatment tank.

In sequence 1, the flow (e.g., stormwater and/or combined sewer overflow) entering the system at the start of a storm event is treated in the settling treatment tank. All the water entering the system is routed to the inlet of the settling treatment tank, flows through the separation chambers of the settling treatment tank, and is collected in the outlet channel of the settling treatment tank. Since the settling/storage treatment tank is not needed, it remains empty.

In sequence 2, which is the next stage of the storm event, the amount of water entering the system exceeds the predefined maximum flow rate for the settling treatment tank. In this condition, the flow rate of water entering the settling treatment tank is regulated so that the overflow of the settling treatment tank has a desired water quality. Any excess flow (i.e., flow which the settling tank cannot accept) is directed into the settling/storage treatment tank. The settling/storage treatment tank will gradually begin to fill up, but no water will exit the settling/storage treatment tank until the water level in the settling/storage treatment tank is high enough to overflow the outlet weirs of the outlet channel.

In sequence 3, the water level in the settling/storage treatment tank is high enough to overflow the outlet weirs, and both the settling and settling/storage treatment tanks are providing an outflow of treated water. Particles are collected in the bottom of the settling and settling/storage treatment tanks in the sludge chambers.

Sequence 4 represents the next step when the stormwater is decreasing at the last part of the storm event. From this sequence on it is possible to start the discharge of the accumulated sludge through the sludge exit pipes. When sludge is removed from the settling and settling/storage treatment tanks, the water level in the tanks is lowered below the top of the outlet weirs, and the water overflowing the outlet weirs to create the outflow is interrupted. The sludge may be pumped from both the settling and settling/storage treatment tanks simultaneously so that the outflows from the entire system is interrupted, or sludge may be pumped from a single treatment tank at a time so that an outflow is maintained, but at a decreased rate. The air distribution pipes (not shown in FIG. 9, but illustrated in FIGS. 1, 2, 3 and 5) can be activated at this time to dislodge clogged particles on the plates.

In sequence 5, the storm event is over and there is no water flowing into the system. The water volume in the settling/storage tank is now pumped to the settling tanks for treatment. Consequently, the settling/storage tanks are emptied and are ready to start the next filling sequence when the next storm event occurs.

Figure 7:
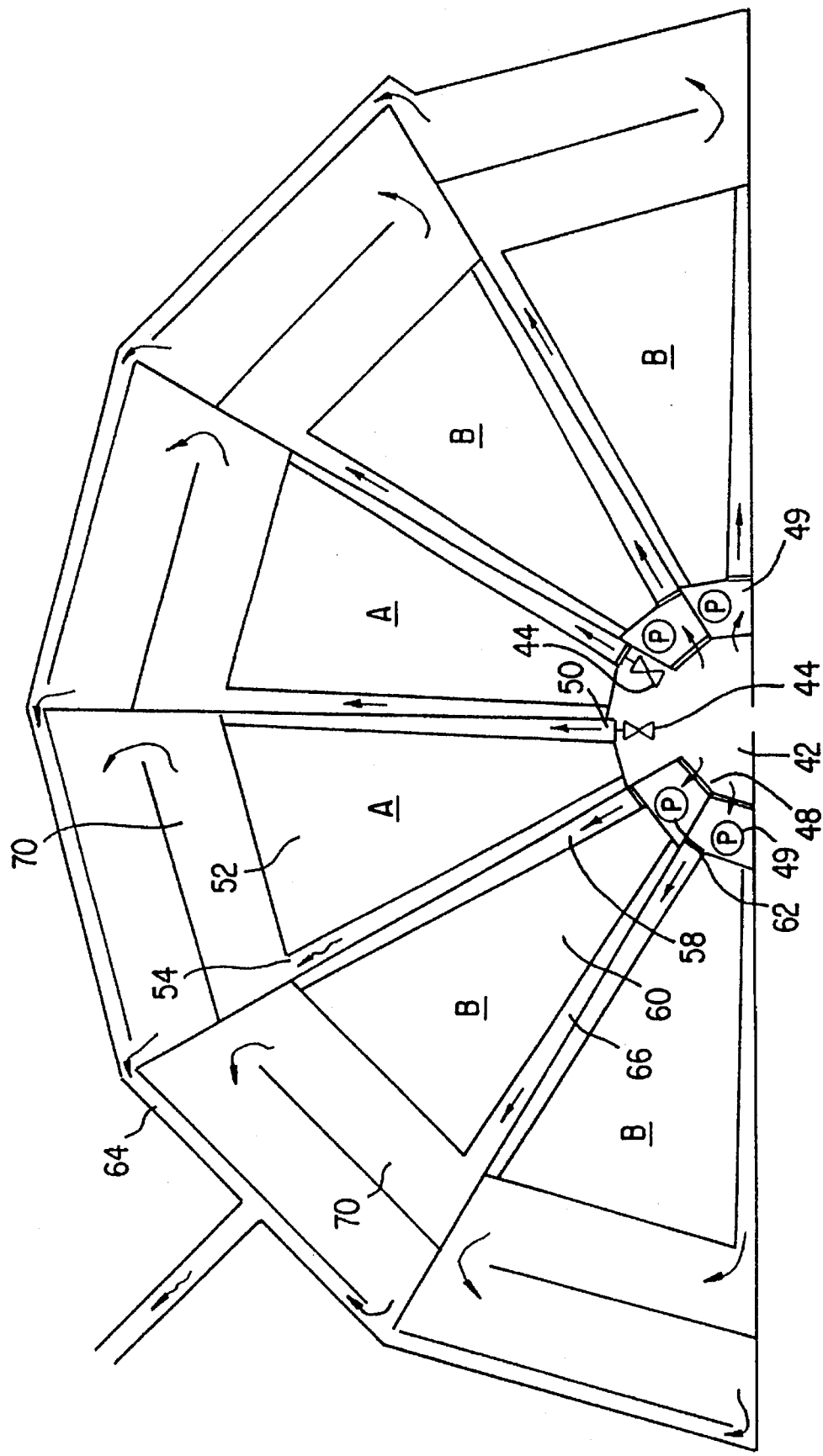
FIG. 7 is a plan view of another treatment system of the present invention.

Another embodiment of the treatment system of the present invention is shown in FIG. 7. In this embodiment, the treatment tanks are pie-shaped segments which allow for a compact system. The pie-shaped tanks have the same structure and function as the rectangular tank system shown in FIG. 6. However, the pie-shaped tanks offer more equal flow distribution to the separate tanks than the rectangular tanks. The separation chambers 52, 60 are located between the inlet chambers 52, 58 and the outlet channels 64, 66.

Water enters the system through a main inlet area 42 and is directed to the settling treatment tanks A through inlet flow valves 44 which limit the flow rate entering the settling treatment tanks A. Water enters the settling treatment tanks through inlet chambers 50, passes through separation chambers 52, then overflows outlet weirs into outlet channels 54 to form an outflow.

Chambers for disinfection and/or chemical treatment 70 may be provided as part of the treatment tanks. The chambers 70 communicate with the outlet channels 54 of the treatment tanks. Chemicals may be introduced into the outflow in the chambers 70 for disinfection and/or chemical treatment of the outflow. After passing through the chambers 70 for disinfection and/or chemical treatment the treated water exits the settling treatment tanks A and is collected in a common outlet channel 64.

The inlet flow valves 44 limit the flow rate of water entering the settling treatment tanks A. When the flow rate of the water increases to the level where the settling treatment tanks can no longer treat all the flow, the water level in the inlet area 42 rises and eventually overflows inlet weirs 48. Water flowing over the inlet weirs 48 enters the settling/ storage inlet areas 49, and is directed through the settling/ storage treatment tanks B. When the water level is high enough, water flows through the separation chambers 60 of the settling/storage treatment tanks B, overflows outlet weirs, and is collected in the outlet channels 66 of the settling/storage treatment tanks B to form an outflow. As in the settling treatment tanks A, chambers 70 for disinfection and/or chemical treatment may be provided in the settling/ storage treatment tanks B. The outflow of the settling/ storage treatment tanks is joined with the outflow from the settling treatment tanks in the common outlet channel 64.

Inclined parallel plates are used in many treatment tanks for removing large particles with good settling characteristics. When it is necessary to remove small, light particles with poor settling characteristics, or sticky particles that tend to adhere to and clog the plates, the inclined parallel plate systems have serious disadvantages. Either the particles do not settle toward the bottom before overflowing the outlet weirs, or the particles clog between the plates, necessitating frequent removal and cleaning of the plates.

The tanks and systems of the present invention eliminate these drawbacks so that inclined parallel plate treatment systems can be used in a broader variety of applications. The air distribution pipes provide bubbles that release particles clogged between the plates without any necessity to remove the plates from the tank for separate cleaning, and without causing any escape of rinsed particles over the outlet weirs. Providing outlet weirs on both sides of the outlet channels, and extending the weirs for the entire length of a treatment tank, maximizes the length of the outlet weirs. This, in turn, allows the overflow rate of water per unit length of the outlet weirs to be minimized for a given tank flow rate. The low overflow rate per unit length of the outlet weirs also allows a system of the present invention to be used to effectively treat large flows with low particle concentrations.

While the invention has been described in connection with the preferred embodiments, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A water treatment tank for separating particles from water, comprising:

at least one separation chamber having at least one set of inclined parallel plates, with a slot between each pair of adjacent plates for substantially horizontal flow of water between the plates, the at least one set of plates having a longitudinal axis defining a width of the separation chamber, the separation chamber having a length perpendicular to the width, passage of the water between the plates separating particles from the water;

a sludge chamber beneath each separation chamber for collecting sludge comprising the particles separated from the water during passage of the water through the separation chamber;

an inlet chamber communicating with one side of each separation chamber for introducing the substantially horizontal flow of water into the separation chamber;

an outlet chamber communicating with an opposite side of each separation chamber for receiving the flow in the substantially horizontal direction from the separation chamber, the outlet chamber being located above and communicating with the sludge chamber and further separating particles from the water in the outlet chamber, the particles descending into the sludge chamber; and an outlet channel located in an upper portion of the outlet chamber and extending for the length of the separation chamber, the outlet chamber including a first outlet weir and a second outlet weir, the first outlet weir located along one side of the outlet channel and extending the length of the separation chamber, the second outlet weir located along an opposite side of the outlet channel and extending the length of the separation chamber, a surface layer of water in the outlet chamber overflowing the first and second outlet weirs into the outlet channel to create an outflow, an overflow rate of water per unit length of the first and second outlet weirs being minimized for a given tank flow rate.

2. The tank of claim 1, further comprising a baffle extending downward from the separation chamber for the length of the separation chamber to prevent a short circuit flow of water from the inlet chamber, underneath the separation chamber, and into the outlet chamber.

3. The tank of claim 1, further comprising a gas distribution pipe located beneath the inclined plates for periodically emitting pulses of gas bubbles during a plate rinsing cycle to dislodge particles trapped between the plates.

4. The tank of claim 3, further comprising:

a sludge discharge pipe communicating with a base of the sludge collection chamber;

a sludge valve located between the sludge discharge pipe and the sludge collection chamber for providing selective communication between the sludge discharge pipe and the sludge communication chamber; and a controller connected to the sludge valve to open the sludge valve and lower a water level in the outlet chamber below the first and second outlet weirs, the controller further connected to the gas distribution pipe to control the plate rinsing cycle by introducing gas into the gas distribution pipe to emit a pulse of gas bubbles, the outflow of water overflowing the first and second outlet weirs being interrupted during the plate rinsing cycle.

5. The tank of claim 3, further comprising a controller for periodically introducing gas into the gas distribution pipe to periodically emit a pulse of gas bubbles during the plate rinsing cycle.

6. The tank of claim 1, further comprising a sludge discharge pipe at the base of the sludge chamber for removing sludge from the sludge chamber.

7. The tank of claim 1, further comprising:

a collection chamber located between the separation chamber and the outlet chamber;

a separating device separating the collection chamber from the outlet chamber; and a collection channel located in an upper portion of the collection chamber and having a weir on each side of the collection channel for collecting floating contaminants on a surface layer of the collection chamber.

8. The tank of claim 7, wherein the separating device includes a baffle located between the collection chamber and the outlet chamber and extending downward toward the sludge chamber.

9. The tank of claim 1, further comprising:

scraper blades, located in a lower portion of the sludge chamber for scraping sludge in the sludge chamber towards a sludge collection area.

10. The tank of claim 1, wherein the tank is substantially cylindrical, the inlet chamber extends along a diameter of the substantially cylindrical tank, and a separation chamber and an outlet chamber are located on each side of the inlet chamber, outlet channels in each outlet chamber extending along an arc of the substantially cylindrical tank.

11. A water treatment tank for separating particles from water, comprising:

at least one inlet chamber for introducing a substantially horizontal flow of water into a central portion of the treatment tank;

at least two separation chambers located on opposite sides of the at least one inlet chamber, each of the separation chambers having a plurality of inclined parallel plates, with a slot between each pair of adjacent plates for substantially horizontal flow of water between the plates, each plate having a longitudinal axis defining a width of the separation chamber, the separation chambers having a length perpendicular to the width, passage of the water between the plates separating particles from the water;

a sludge chamber beneath each separation chamber for collecting sludge comprising particles separated from the water during passage of the water through the inclined parallel plates;

at least two outlet chambers, each outlet chamber being located on a side of a corresponding separation chamber opposite the inlet chamber, each outlet chamber receiving the flow in a substantially horizontal direction from the corresponding separation chamber, each of the outlet chambers being located above and communicating with the corresponding sludge chamber and further separating particles from the water in the outlet chamber, the particles descending into the sludge chamber; and at least two outlet channels, each outlet channel being located in an upper portion of a corresponding outlet chamber and extending for the length of the corresponding separation chamber, each outlet chamber including a first outlet weir and a second outlet weir, each first outlet weir located along one side of a corresponding outlet channel and extending the length of the corresponding separation chamber, each second outlet weir located along an opposite side of the corresponding outlet chamber and extending the length of the corresponding separation chamber, a surface layer of water in the outlet chamber overflowing the first and second outlet weirs into the outlet channel to create an outflow, an overflow rate of water per unit length of the first and second outlet weirs being minimized for a given tank flow rate.

12. The tank of claim 11, further comprising a baffle extending downward from each separation chamber for the length of the separation chambers to prevent a short circuit flow of water from the inlet chamber, underneath the separation chambers, and into the outlet chambers.

13. The tank of claim 11, further comprising a gas distribution pipe located beneath the inclined parallel plates in the separation chambers for periodically emitting pulses of gas bubbles for dislodging particles trapped between the plates of the separation chambers during a plate rinsing cycle.

14. The tank of claim 13, further comprising a controller for periodically introducing gas into the gas distribution pipe to periodically emit a pulse of gas bubbles during the plate rinsing cycle.

15. The tank of claim 11, further comprising:

a collection chamber between each separation chamber and corresponding outlet chamber;

a separating device separating each collection chamber from the corresponding outlet chamber; and a collection channel located in an upper portion of each collection chamber and having a weir on each side of the collection channel for collecting floating contaminants on a surface layer of water in the collection chamber.

16. The tank of claim 15, further comprising a baffle located between each collection chamber and corresponding outlet chamber, the baffles extending downward from above a surface of the water in the tank.

17. The tank of claim 11, further comprising:

scraper blades, located in lower portions of the sludge chambers for scraping sludge in the sludge chambers towards a sludge collection area.

\* \* \* \* \*